(12) United States Patent
Goad

(10) Patent No.: US 8,133,345 B2
(45) Date of Patent: Mar. 13, 2012

(54) METHOD AND APPARATUS FOR LINING PROCESS TANKS

(76) Inventor: Curtis Goad, Ballwin, MO (US)

( * ) Notice: Subject to any disclaimer, the term of this patent is extended or adjusted under 35 U.S.C. 154(b) by 1021 days.

(21) Appl. No.: 11/697,243

(22) Filed: Apr. 5, 2007

(65) Prior Publication Data

US 2008/0245471 A1     Oct. 9, 2008

(51) Int. Cl.
*B29C 65/00* (2006.01)
*B29C 65/02* (2006.01)

(52) U.S. Cl. ....... 156/304.3; 156/71; 156/256; 156/258; 156/293; 156/304.1; 156/304.6; 206/524.3

(58) Field of Classification Search ............ 156/71, 156/256, 258, 293, 304.1, 304.6; 206/524.3; 220/651
See application file for complete search history.

(56) References Cited

U.S. PATENT DOCUMENTS

| | | | |
|---|---|---|---|
| 3,279,971 A | | 10/1966 | Gardener |
| 3,658,627 A | * | 4/1972 | Kaminsky ................ 156/497 |
| 3,853,669 A | | 12/1974 | Werstlein |
| 3,951,308 A | * | 4/1976 | Thirtle ..................... 222/39 |
| 4,102,726 A | | 7/1978 | Brackman |
| 4,457,457 A | * | 7/1984 | Dziki ..................... 222/146.5 |
| 4,796,676 A | | 1/1989 | Hendershot et al. |
| 4,942,978 A | | 7/1990 | Bessette |
| 5,345,666 A | | 9/1994 | Matyja |
| 5,505,814 A | | 4/1996 | Glaser et al. |
| 5,804,112 A | * | 9/1998 | Greene .................... 264/45.9 |
| 5,814,175 A | * | 9/1998 | Rau et al. ................ 156/157 |
| 5,820,718 A | | 10/1998 | Dean |
| 5,836,363 A | | 11/1998 | LaFleur |
| 5,867,883 A | * | 2/1999 | Iorio et al. ................ 29/460 |
| 5,979,686 A | | 11/1999 | Dean |
| 6,394,534 B1 | | 5/2002 | Dean |
| 6,579,439 B1 | * | 6/2003 | Chandler ................. 205/671 |

(Continued)

OTHER PUBLICATIONS

Extrusion Welding of Thermoplastics, the Professional Division of the Welding Institute, Mar. 2002, http://www.twi.co.uk/professional/protected/band_3/jk57.html.
Plastic Welding, The Plastics Distributor & Fabricator, Mar./Apr. 2003, http://www.plasticsmag.com/features.asp?fIssue=Mar/Apr-03.

(Continued)

*Primary Examiner* — Mark A Osele
*Assistant Examiner* — Christopher C Caillouet
(74) *Attorney, Agent, or Firm* — Harness, Dickey & Pierce, P.L.C.

(57) ABSTRACT

A method and apparatus for lining process tanks. The method comprises lining a tank with a plurality of sheets, wherein the tank has walls and a bottom that intersect at a corner of the tank. The method comprises bonding a bottom sheet of the plurality of sheets to the bottom of the tank. Next, a pair of sheets of the plurality of sheets are bonded to adjacent walls of the tank and above the bottom sheet, each sheet of the pair of sheets having a first edge and a second edge such that the first edges of the pair of sheets are positioned at the intersection of adjacent walls of the tank to position an interface between the pair of sheets. The method also comprises extrusion welding the pair of sheets together by infusing a molten thermoplastic material along the pair of sheets and within the interface of the pair of sheets. Additionally, the method comprises extrusion welding the pair of sheets to the bottom sheet by infusing the molten thermoplastic material along and between the pair of sheets and the bottom sheet wherein the infused thermoplastic material seals the pair of sheets and bottom sheet to isolate the tank from contents that contact the pair of sheets and bottom sheet.

18 Claims, 9 Drawing Sheets

U.S. PATENT DOCUMENTS

| | | | |
|---|---|---|---|
| 2001/0004992 A1 | 6/2001 | Kawasaki et al. | |
| 2001/0011672 A1 | 8/2001 | Aota et al. | |
| 2001/0023566 A1 | 9/2001 | Ezumi et al. | |
| 2002/0119336 A1 | 8/2002 | Kawasaki et al. | |
| 2003/0056459 A1 | 3/2003 | Ezumi et al. | |
| 2004/0067381 A1 | 4/2004 | Grund et al. | |
| 2005/0011159 A1* | 1/2005 | Standal et al. | 52/716.1 |
| 2005/0129796 A1 | 6/2005 | Bortoli | |
| 2006/0051442 A1 | 3/2006 | Miceli et al. | |
| 2006/0054661 A1 | 3/2006 | Di Miceli et al. | |
| 2006/0057241 A1 | 3/2006 | Di Miceli et al. | |

OTHER PUBLICATIONS

Knight, A., Extrusion welding of thermoplastics, The Professional Division of The Welding Institute, Mar. 2002, retrieved from website web.archive.org/web/20051001073024/http://www.twi.co.uk/professional/protected . . . on Jun. 1, 2011 (3 pages).

Plastic Welding, The Plastic Distributor & Fabricator—Your Industry Magazine, retrieved from website web.archive.org/web/20040331032446/http://www.plasticsmag.com/features.asp?fIss . . . on Jun. 1, 2011 (6 pages).

* cited by examiner

FIG. 18
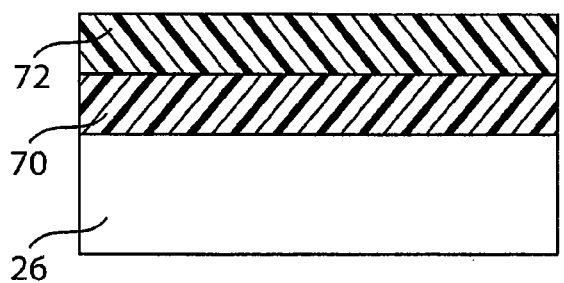
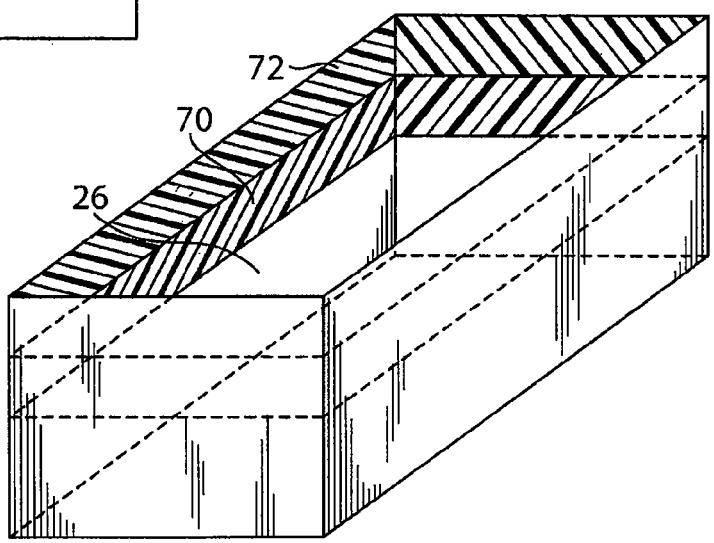
FIG. 19
FIG. 20
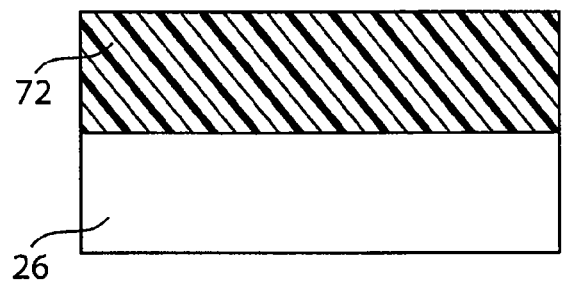
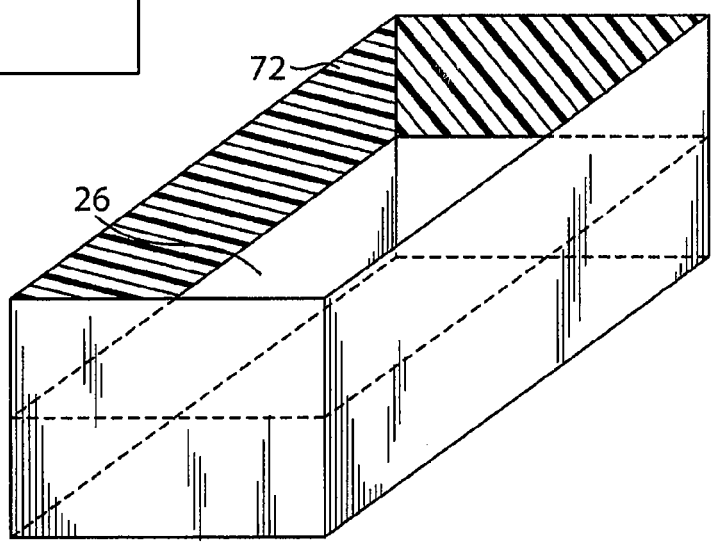
FIG. 21

```
┌─────────────────────────────────────────┐
│ bonding a bottom sheet 44 of plurality  │
│ of sheets to a bottom 32 of a tank 28   │
└─────────────────────────────────────────┘
                    ↓
┌─────────────────────────────────────────┐
│ bonding a pair of sheets 40 of the      │
│ plurarity of sheets 38 to adjacent      │
│ walls of the tank 28 and above the      │
│ bottom sheet 44, each sheet of the pair │
│ of sheets 40 having a first edge 46 and │
│ a second edge 48 such that the first    │
│ edges 46 of the pair of sheets 40 are   │
│ positioned at the intersection of       │
│ adjacent walls of the tank 28 to        │
│ position an interface 56 between the    │
│ pair of sheets 40                       │
└─────────────────────────────────────────┘
                    ↓
┌─────────────────────────────────────────┐
│ extrusion welding the pair of sheets 40 │
│ together by infusing a molten           │
│ thermoplastic material 62 along the     │
│ pair of sheets 40 and within the        │
│ interface 56 of the pair of sheets 40   │
└─────────────────────────────────────────┘
                    ↓
┌─────────────────────────────────────────┐
│ extrusion welding the pair of sheets 40 │
│ to the bottom sheet 44 by infusing the  │
│ molten thermoplastic material 72 along  │
│ and between the pair of sheets 40 and   │
│ the bottom sheet 44 wherein the infused │
│ thermoplastic material 62 seals the     │
│ pair of sheets 40 and the bottom sheet  │
│ 44 to isolate the tank 28 from contents │
│ that contact the pair of sheets 40 and  │
│ the bottom sheet 44                     │
└─────────────────────────────────────────┘
```

FIG. 22

METHOD AND APPARATUS FOR LINING PROCESS TANKS

CROSS-REFERENCE TO RELATED APPLICATIONS

Not Applicable.

STATEMENT REGARDING FEDERALLY SPONSORED RESEARCH

Not Applicable.

BACKGROUND OF THE DISCLOSURE

The present disclosure relates to a method of lining a process tank, and in particular, the present disclosure relates to lining a process tank using sheets that are extrusion welded together by infusing molten thermoplastic material within the interfaces of adjacent sheets. The present disclosure also relates to a resultant lining formed by the welded sheets and infused material. For descriptive purposes, the term "liner" and "lining" are used interchangeably.

Currently, contents such as acids and chemicals are stored in tanks usually in the form of process tanks. These tanks relate to immobile types that may be installed above or below the ground, but also for the transportable types that are part of the over-the-road semi-trailers. The tanks may also be used on or in marine vessels as well as railroad cars. The size of the tank is not material, but the large tanks typically hold 1,000 gallons or more. Moreover, process tanks are particularly adaptable for tanks intended for highly corrosive liquids, but also may be used in conjunction with other pourable materials such as grain and pellets.

Most process tanks of the type considered are steel tanks which, over a period of time, may become corroded as a result of the fluids stored therein, or because of the rusting action of the exterior elements (ground water, rain, etc.). If the material stored in such tanks is corrosive, the corrosive material can contact the tank. In this situation, the life expectancy of the tank is relatively short and thus it becomes not only extremely expensive for replacement, but also highly dangerous for people and the environment. Furthermore, there is danger in the event that the tanks leak or are ruptured, or somehow fail to retain the contents and leak the contents into the ground (if the tanks are subterranean). If they are above-the-ground storage tanks, or to the passing public if the tanks are over-the-road type, there is danger along the highways and to the passing public. Accordingly, many process tanks utilize a protective liner or lining.

One common type of liner is a pre-fabricated "drop-in" liner. While drop-in liners may be machine welded (radio frequency welding is commonly used for these liners), the drop-in liners have disadvantages with respect to a bonded lining. During the drop-in process, air is entrapped behind the liner, which can condense and cause the mild steel tank to rust. Furthermore, during the drop-in process, creases form in the liner sheet, which stresses the liner material and leads to premature cracking and failure. Additionally, a tank part may catch the crease or protruding wrinkle and cause tear damage to the drop-in liner. When the drop-in liner develops a leak, solution seeps behind the liner pushing it off the walls or bottom and causing the liner itself to move into the process tank area resulting in operational problems. Once solution is behind a drop-in liner, the liner is very difficult to repair, since it may be almost impossible to find the source of the leak. Replacing the drop-in liner creates significant downtime, especially for electroplating tanks with auxiliary equipment affixed to the tank rim, i.e., ventilation hoods, piping, anode and cathode bars, heat exchangers and probes, level control devices, etc Another common liner is a bonded to metal lining. As will be discussed, this liner uses manual "flat strip" welds on the butted side panels and "corner strip" welds on the vertical joining walls and side to bottom joints.

In current lining procedures, installation personnel prepare the interior of the surface of the tank 10 (FIG. 1) to receive the liner 14. This preparation includes surface blasting the interior of the tank 10 and subsequent cleaning of the interior of the tank 10. With respect to the liner 14, the installer cuts sheets of liner 16 (FIG. 2) from a roll of liner material. At the installation site, the installer applies an adhesive to the now cut sheets of liner 16. Then, the installer manually applies the liner sheets 16 to the interior of the tank 10. As known in the art, heat may be applied to the liner sheets 16 to assist in applying the liner sheets 16 to the tank wall. Tanks typically have protrusions such as tank welds that bond the tank walls to the tank bottom. These tank welds protrude into the interior of the tank. Even careful placement of the sheets 16 will result in gaps between the sheets 16 that are placed over the protruding welds. In other words, the sheets 16 will lay over the protrusions further enhancing the gaps between the sheets 16.

As shown in FIG. 2, current cutting procedures result in uneven and/or rough edges 18 for each liner sheet 16. When the installer adheres the liner sheets 16 to the tank 10 and next to each other, the rough edges 18 of the liner sheets 16 do not evenly match resulting in gaps 20 forming between the sheets 16. When the installer cuts relatively smooth edges 18, installation gaps 20 still exist between the adjacent liner sheets 16 due to the difficult and labor intensive installation process (FIG. 3). For example, the liner sheets are heavy and difficult to manage as the installer handles the sheets while positioned within the tight constraints of the process tank, i.e., a confined space with elevated temperatures. As such, the installer may apply adjacent sheets 16 in a non-uniform layout and/or with a distance between them, further enhancing the gaps 20 between the edges 18 of the sheets 16. Applying the sheets at a corner of the tank 10 is particularly troublesome due to the space and angle considerations of the corner of the tank 10.

After applying the liner sheets 16, the installer welds a weld strip 22 (known as a "cap over flat strip weld" or a "cap over corner strip weld") along the interface between a pair of adjacent sheets 16 (FIGS. 2 and 3). The installer manually welds the weld strip 22 to the adjacent liner sheets 16. The welders used in this process heat the weld strip 22 to the liner sheets 16. Similar to the application of the liner sheets 16, hand welding the weld strips 22 is a labor-intensive process. Maintaining consistent pressure with the welder is difficult since the touch of the installer applies the pressure. Additionally, it is difficult with the hand welder to maintain a constant distance between the welding nozzle and the welding strip. Furthermore, the weld strip may melt faster than the liner sheet, so the welding process must be done with special care. The sheets must be heated to a glossy state, yet the weld strip or the sheets cannot be charred, as that would result in a failed weld.

The installer typically welds from the top of the liner sheet 16 to the bottom. As the process tank may have a height such as twelve feet, this height causes starts and stops as opposed to continuous welds with tightly controlled temperatures and consistency in both pressure and timing. In addition, welding occurs within the tight constraints of the process tank such that the installer does not provide a constant weld over any length of time. The tedious and laborious process for strip welding not only applies to welding strips to corner sheets; but also, applies to welding strips for sheets applied to the walls of the process tank 10.

The human element of welding the strips 22 leads to weak welds (i.e., inconsistency of temperature, pressure and timing—the critical variables for welds) and leads to voids or "pinholes" 24 within the weld that bonds the weld strip 22 to the liner sheets 16 (FIG. 4). The pinholes 24 shown in FIG. 4 are exaggerated for purposes of clarity. Although the welded strip 22 may pass a "spark test" commonly used in the art, these pinholes 24 lead to problems for the process tank 10 as will be discussed. Furthermore, the corner weld that bonds sides and the bottom of the process tank further exaggerates the effects of the gaps 20 and the pinholes 24 since the liner sheet 16 must position over the corner weld of the process tank 10. This corner weld or other obstacle leaves a void between the sheet 16 and the tank weld.

When the tank 10 is filled with fluid 12 (FIG. 1) such as an acid, the pressure of the fluid forces the fluid through the pinholes 24. Consequently, the fluid forces through the gaps 20 and disperses between the liner 14 and the tank 10. This leaked fluid then corrosively attacks the tank wall. Additionally, this leaked fluid may also corrosively attack the adhesive interface between the liner 14 and the tank wall resulting in the liner 14 pulling away from the tank wall. Accordingly, the gaps 20 and the pinholes 24 between the liner sheets 16 lead to adverse and dangerous conditions. When the installer repairs the welded strip, the heat from the repair welder draws the leaked fluid toward the interface of the adjacent liner sheets, wherein this fluid further attacks the tank wall positioned behind the repaired weld strip.

Process tanks with bonded linings require a lining that eliminates gaps between edges of adjacent liner sheets. Process tanks also require machine quality consistent strong welds created with consistent pressure, temperature and timing that effectively seals the tank from the contents that contact the liner.

The foregoing and other objects, features, and advantages of the disclosure as well as presently preferred embodiments thereof will become more apparent from the reading of the following description in connection with the accompanying drawings.

BRIEF SUMMARY OF THE DISCLOSURE

The present disclosure relates to a method of lining a tank with a plurality of sheets. The tank has walls and a bottom that intersect at a corner of the tank. The method comprises bonding a bottom sheet of the plurality of sheets to the bottom of the tank. The method also comprises bonding a pair of sheets of the plurality of sheets to adjacent walls of the tank and above the bottom sheet, each sheet of the pair of sheets having a first edge and a second edge such that the first edges of the pair of sheets are positioned at the intersection of adjacent walls of the tank to position an interface between the pair of sheets. The pair of sheets is then extrusion welded together by infusing a molten thermoplastic material along the pair of sheets and within the interface of the pair of sheets. Additionally, the method comprises extrusion welding the pair of sheets to the bottom sheet by infusing the molten thermoplastic material along and between the pair of sheets and the bottom sheet wherein the infused thermoplastic material seals the pair of sheets and bottom sheet to isolate the tank from contents that contact the pair of sheets and bottom sheet.

BRIEF DESCRIPTION OF THE SEVERAL
VIEWS OF THE DRAWINGS

In the accompanying drawings which form part of the specification:

FIG. 18 is a partial side view of another embodiment of the present disclosure illustrating a sacrificial layer and an intermediate layer bonded to a lining;

FIG. 19 is a front prospective view of an embodiment of the lining of the present disclosure illustrating the sacrificial layer and intermediate layer bonded to the lining;

FIG. 20 is a partial side elevational view of another embodiment of the present disclosure illustrating the sacrificial layer of FIG. 18 bonded to the lining;

FIG. 21 is a front prospective view of an embodiment of the lining of the present disclosure illustrating the sacrificial layer of FIG. 20 bonded to the liner; and FIG. 22 is a flowchart illustrating welding steps in accordance with and embodying the present disclosure.

Corresponding reference numerals indicate corresponding parts throughout the several figures of the drawings.

DESCRIPTION OF THE PREFERRED EMBODIMENT

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure.

Figure 5:
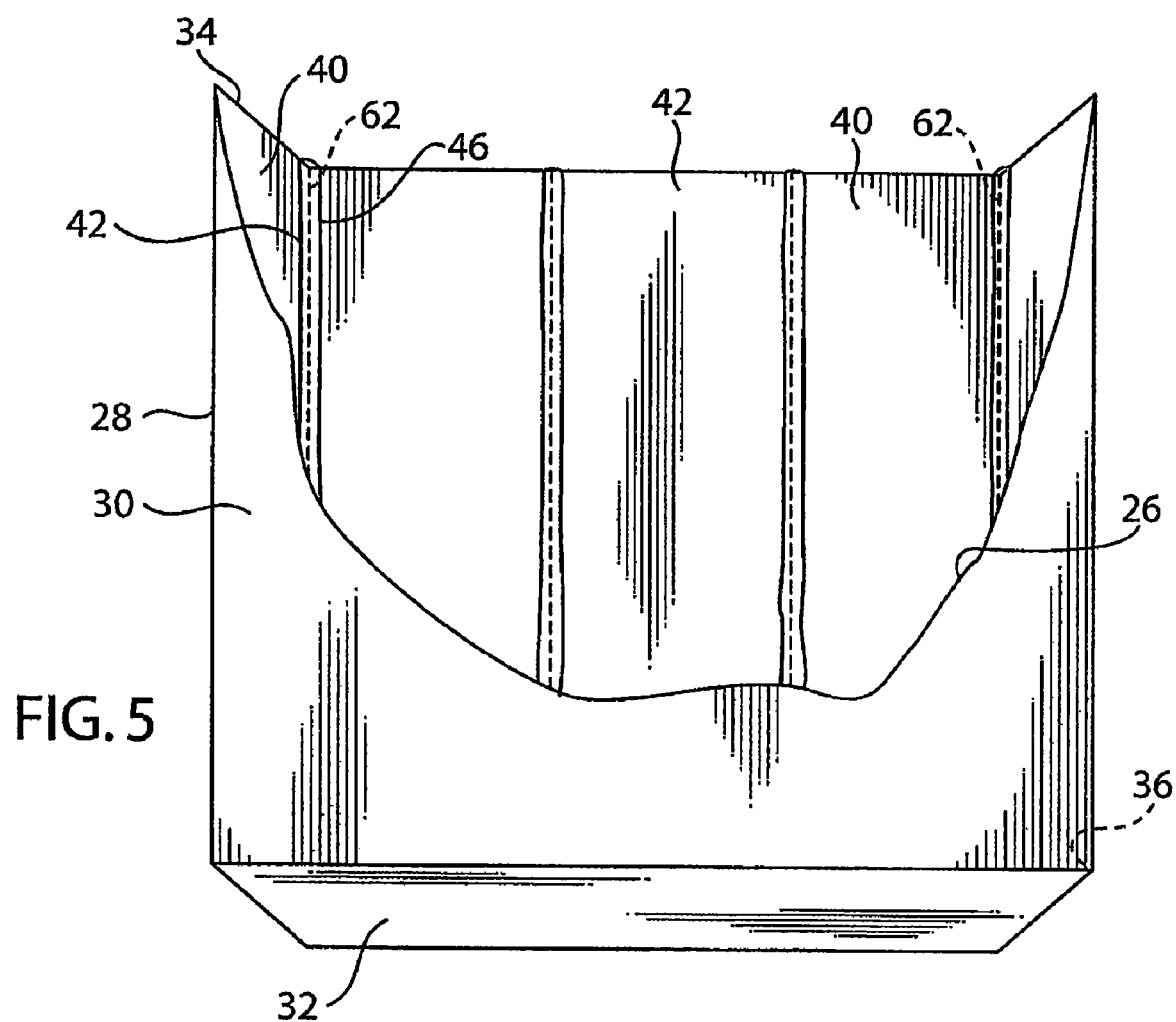
FIG. 5 is a partial sectional front view of a lining constructed in accordance with and embodying the present disclosure disposed within a tank.

Referring to FIGS. 5-21, the present disclosure relates to forming a lining 26 and applying the lining 26 to a tank 28 (FIG. 5). As shown, the tank 28 has walls 30, a bottom 32 and a top 34, wherein the walls 30 and bottom 32 intersect at corners 36 of the tank 28. The tank 28 may also include a cover (not shown) and other components (not shown) such as a manhole access, access doors and supply/drain valves. Prior to applying the lining 26 of the present disclosure, installation personnel form the lining 26 and prepare the tank 28.

For the surface preparation of the tank 28, the material shall be free from physical imperfections and all sharp edges on the interior of the tank 28 shall be ground smooth. The thickness and weight per square foot shall be within the ASTM and AISI tolerances. Furthermore, any welded parts of the tank 28 shall be fabricated in accordance with standardized commercial practice to obtain a practical and uniform quality. Rectangular open tanks, in particular, shall be properly reinforced with girth angles in accordance with accepted practice in order to provide adequate structural strength and prevent bulging. If welding is required on inside corners, the welds must be smooth with no porosity, high spot lumps or pockets. The size construction and location of outlets, openings and/or valve sleeves shall be fabricated in accordance with standardized commercial practice.

During preparation, the installer removes any sharp edges on the interior surface. The installer then prepares the interior of the surface of the tank 28. In doing so, the installer blasts or grinds the interior of the tank 28 to be free from oil, grease and chemicals. The installer may grit blast steel to a white metal finish in accordance with steel structures and painting standards. The installer may also clean the surface by using steam-cleaning procedures. All rusts, scale and dirt are removed during the cleaning process. After blasting or grinding, brushing or vacuuming removes all remaining debris. Furthermore, the installer may apply a primer to prevent oxidation of any metal surfaces.

With respect to the lining 26, the installer processes a plurality of sheets 38 (FIGS. 6 and 7) that eventually form the lining. The installer may process the plurality of sheets 38 at the location of the tank 28 by cutting the sheets from a roll of liner material. The installer may also process the plurality of sheets 38 from the roll of liner material at an offsite location. The roll of liner material for the liner 26 comprises an extruded plasticized polyvinyl chloride sheet membrane. One such liner material is sold under the brand name "Koroseal®" or "High Performance Koroseal®" manufactured by R.J.F. International Corporation. Other liner materials for the liner 26 include "Amer-Plate®" or "T-Lock®" or "Arrow-Lock®" from Ameron Protective Linings or "Exceline" from F.C. Witt Associates Ltd.

Figure 1:
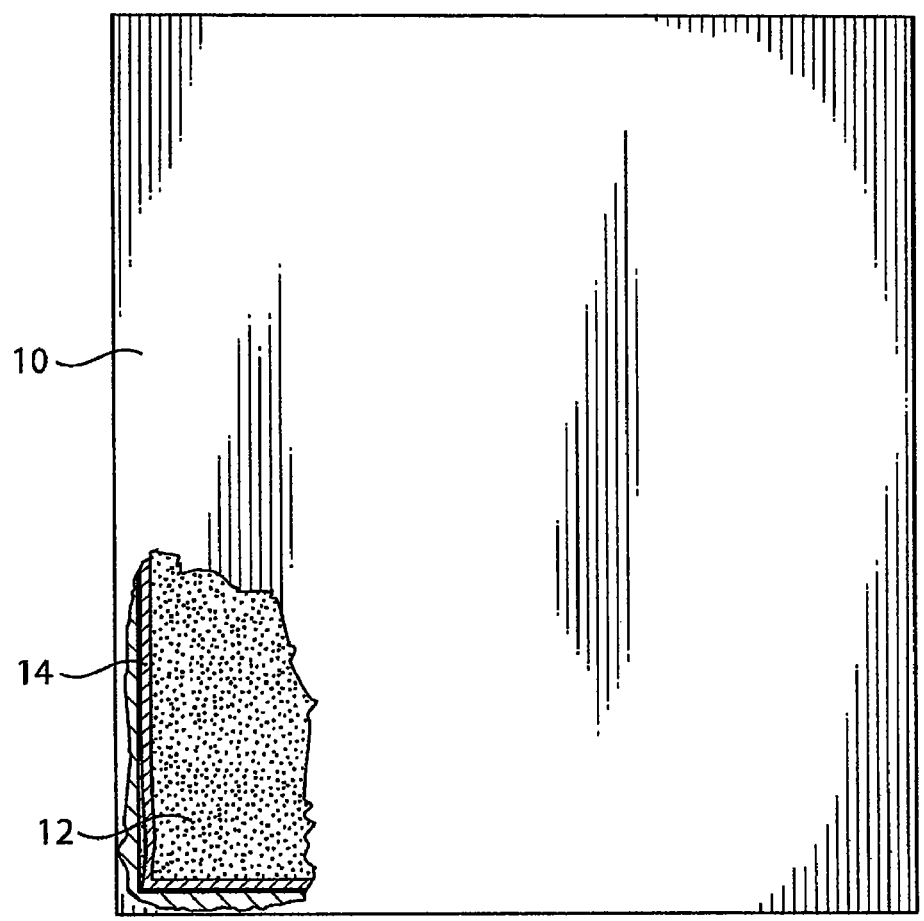
FIG. 1 is a front elevational view of a storage tank having a partial cross sectional view illustrating a current bonded lining applied to the tank walls, and a fluid stored therein wherein the fluid has seeped through the liner and is positioned between the tank walls and the liner.
Figure 2:
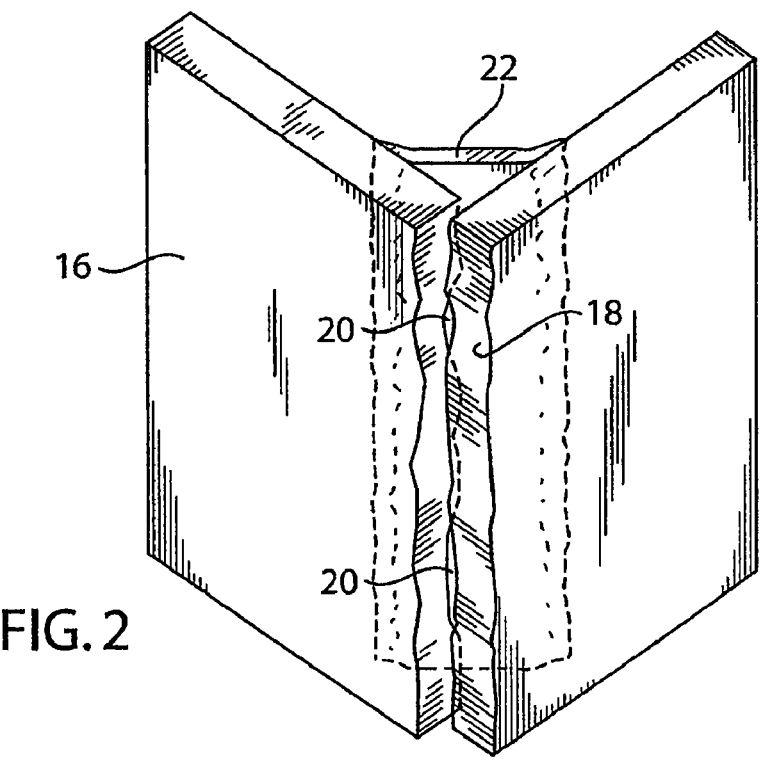
FIG. 2 is a partial perspective view of a corner of a current lining illustrating a pair of liner sheets, a welded strip weld positioned between the pair of liner sheets and gaps positioned between the liner sheets.
Figure 3:
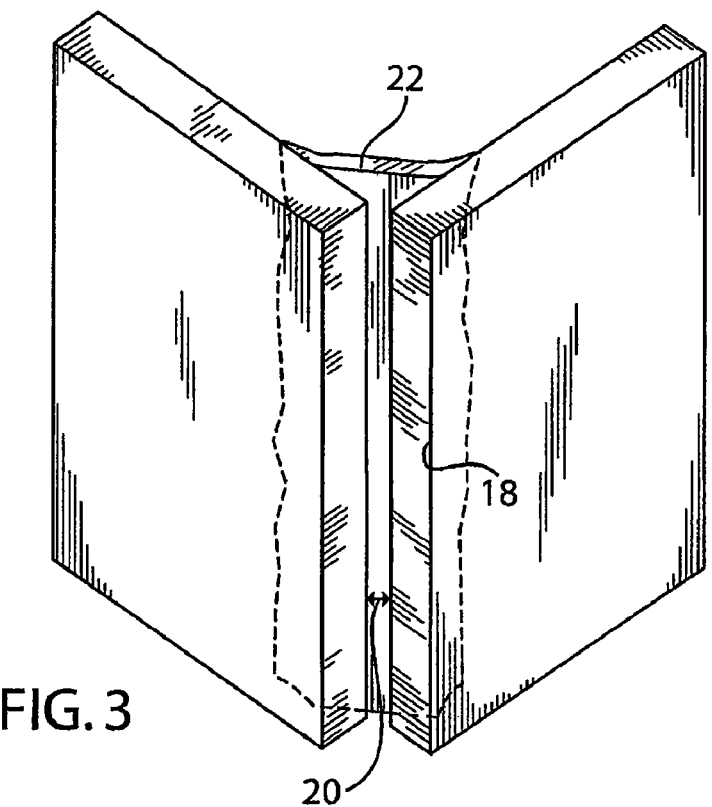
FIG. 3 is a partial perspective view of a corner of another current lining illustrating a pair of liner sheets having smooth edges, a welded strip weld positioned between the pair of liner sheets and a gap position between the length of the liner sheets.
Figure 4:
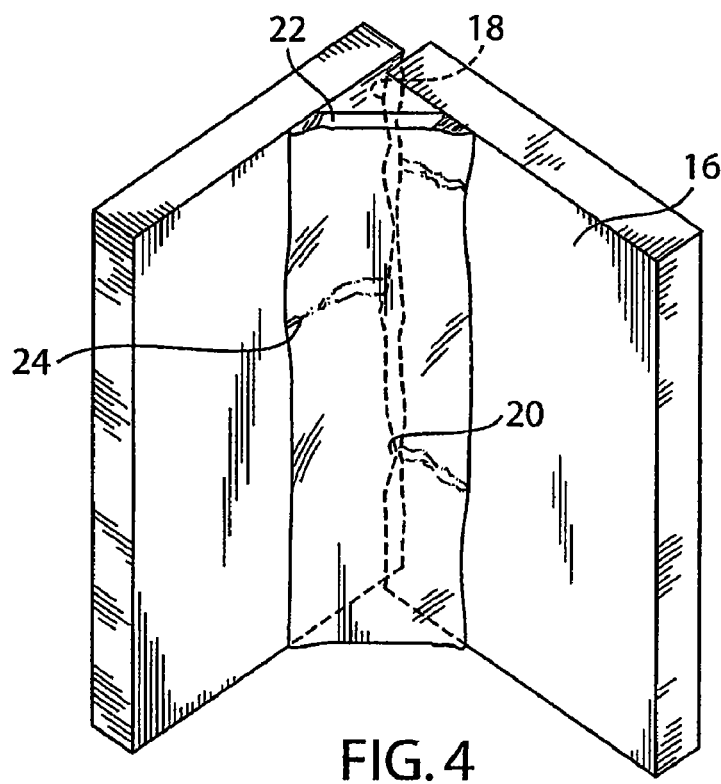
FIG. 4 is a front perspective of the liner sheets, weld strip and gaps of FIG. 3 and further illustrating pinholes formed in the weld that bonds the weld strip to the liner sheets.
Figure 9:
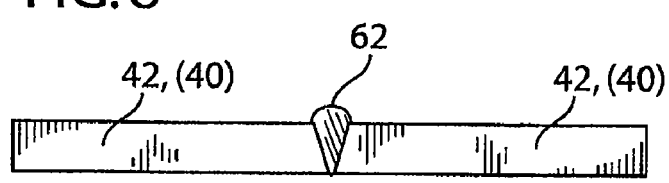
FIG. 9 is a plan view of a pair of extrusion welded side sheets constructed in accordance with and embodying the present disclosure.
Figure 10:
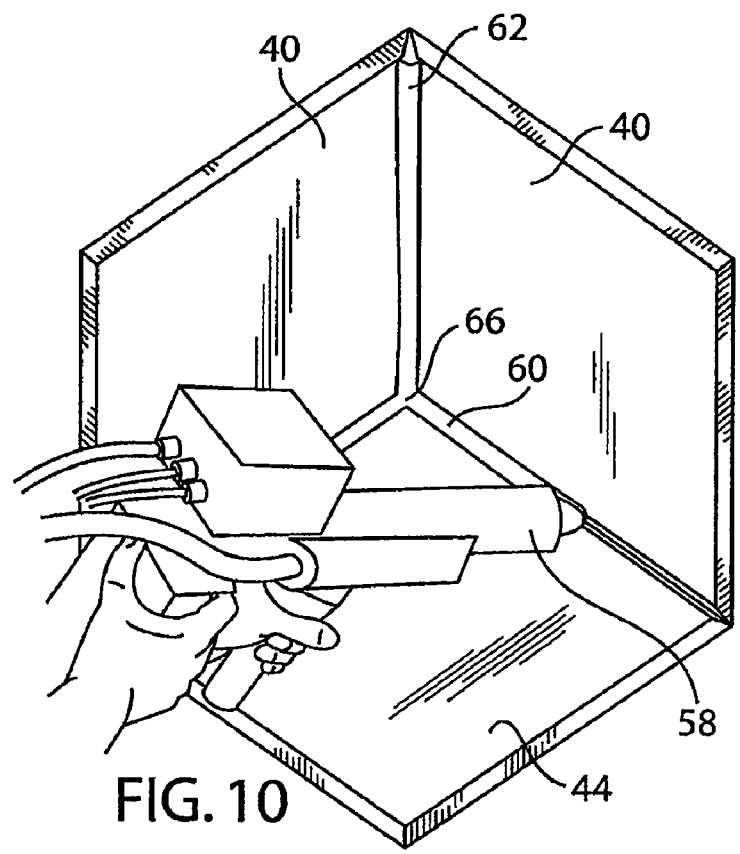
FIG. 10 is a partial perspective view of an infused weld of the present disclosure being applied to the corner of the lining.

During the cutting process, the installer pulls a portion of the liner material from the roll and places the portion over a cutting surface. In one embodiment, the height of the liner material is about eight to about ten feet and the width is about four to about eight feet. Once the proper size of the length of the liner sheet 38 is determined and pulled from the roll of liner material, the installer then cuts off the portion from the roll material to form the plurality of sheets 38 (FIGS. 6 and 7) of liner material. In one embodiment, the plurality of sheets 38 comprises a rectangular configuration. The installer cuts the plurality of sheets 38 in dimensions for use on the walls 30 and the bottom 32 of the tank 28 (FIG. 1). These cut sheets are designated as corner pairs of sheets 40 (FIGS. 6 and 7), side sheets 42 (FIGS. 8 and 9) and bottom sheets 44 (FIG. 10). The lengths and configurations for the bottom sheets 44 are cut according to the respective bottom surface of the tank 28 to which the liner 26 is being applied. The plurality of sheets 38 may contract and expand slightly in width during installation operations and during use (i.e., thermal expansion and contraction). Allowance for such dimension changes is made when cutting the plurality of sheets 38. The installer typically manually cuts the sheets 38 from the roll of liner material. In one embodiment, the thickness of the plurality of sheets 38 is at least $3/32$ inches. In another embodiment, the thickness of the plurality of sheets 38 is about $3/16$ inches.

Figure 6:
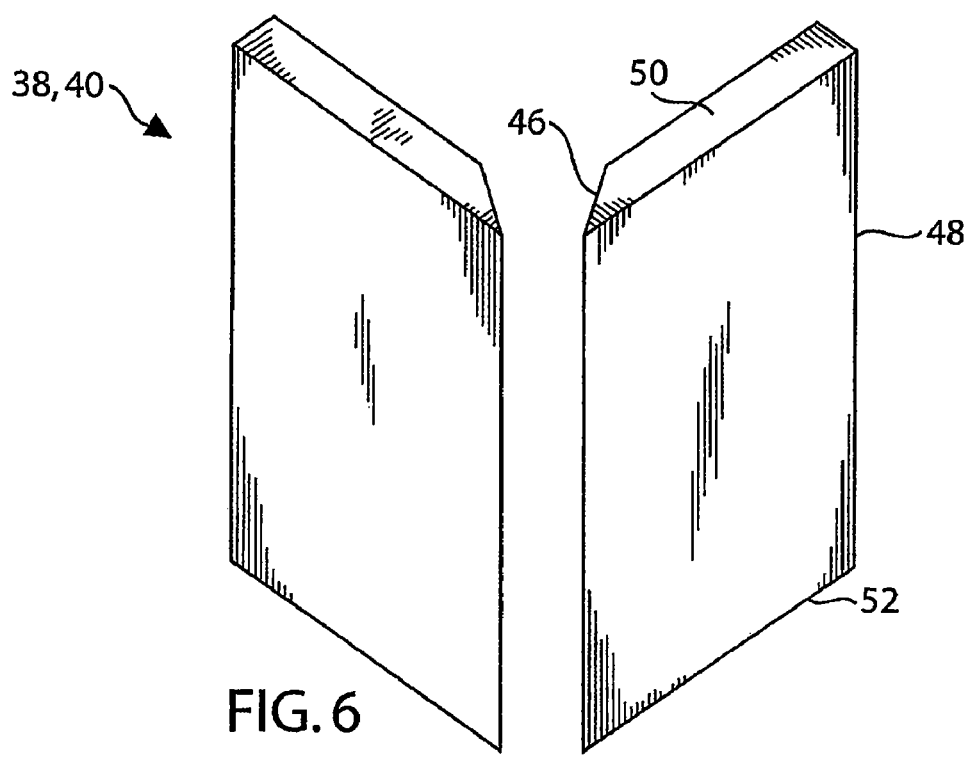
FIG. 6 is a back perspective view of an embodiment of a pair of liner sheets constructed in accordance with and embodying the present disclosure.
Figure 7:
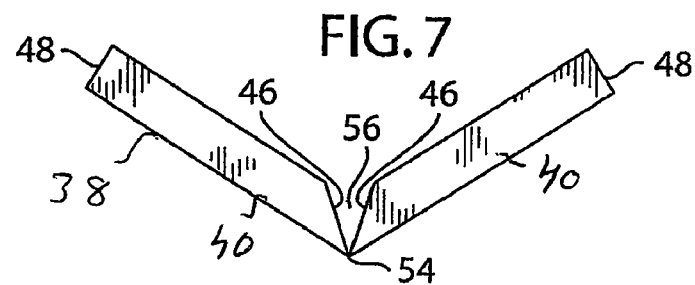
FIG. 7 is a plan view of the pair of liner sheets of FIG. 6 contacting each other to form a corner beveled region.

As shown in FIGS. 6 and 7, each corner sheet 40 of the plurality of sheets 38 has a first edge 46, a second edge 48, a top edge 50 and a bottom edge 52. The installer separates the corner pair of sheets 40 so that the installer may further process the first edge 46 of each sheet 40. The installer first processes, i.e. cuts or scrapes, the first edge 46 of each sheet 40 in order to clear the edge from uneven surfaces. Next, the installer may then bevel the first edge 46. The installer uses a cutting apparatus to bevel the edges 46 at an acute angle. In one embodiment, the installer bevels the first edge 46 at about a 45° angle. The installer then processes, such as by cutting or grinding, the second edge 48 of the sheets 40 in a substantially straight configuration in order to remove any uneven surfaces. The installer may also bevel the second edge 48 of the sheets 40. In one embodiment, the installer bevels these edges 48 at about a 45° angle. The installer may also bevel the edges of the bottom sheet 44 at an acute angle. In one embodiment, the installer bevels these bottom edges at about a 45° angle.

Figure 8:
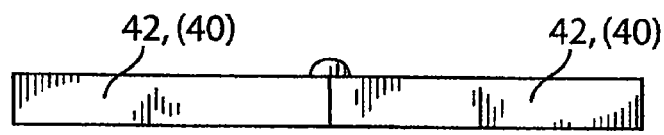
FIG. 8 is a plan view of a pair of butt welded side sheets constructed on a sheet butt welding machine in accordance with and embodying the present disclosure.

For the plurality of sheets 38 that are not designated as corner sheets 40 or bottom sheets 44, the installer processes the edges of these side sheets 42 to remove any uneven surfaces. In one embodiment, the installer processes these edges as substantially straight, i.e., in a non-beveled configuration (FIG. 8). In another embodiment, the installer processes the edges of these sheets 42 in a beveled configuration (FIG. 9). These processes may be shop fabricated.

At the tank site, the installer cleans and prepares surfaces of the tank 28 and the backside of the plurality of sheets 38 so that the installer can apply an adhesive cement to both the prepared surfaces of the tank 28 and the back sides of the plurality of sheets 38. The installer, as part of the cleaning process, may swab the surface of the back of the plurality of sheets 38 with methyl ethyl ketone.

The installer then applies an adhesive cement on the prepared surfaces of the tank 28 and the swabbed backsides of the plurality of sheets 38. More than one coat of cement may be applied to the tank surface and the backside of the plurality of sheets 38. When applying cement with a paint roller the installer uses a short roller in order to prevent excessive cement build up along the tank 28 surface and the backsides of the plurality of sheets 38. In the event the plurality of sheets 38 cannot be applied to the prepared surface of the tank 28 for an extended period of time and the cement loses its tack, the cement surface shall be refreshened or re-tacktified by applying another coat of cement.

After the surface of the tank 28 and the back sides of the plurality of sheets 38 have been properly cemented, the installer bonds the bottom sheet 44 of the plurality of sheets 38 to the bottom 32 of the tank 28. The installer places the bottom sheet 44 against the prepared bottom of the tank 28 and bonds the bottom sheet 44 to the bottom of the tank 28 by rolling or by pressuring the bottom sheet 44 to the bottom of the tank 28 to avoid trapping air between the bottom sheet 44 and the tank 28. The bottom sheet 44 is bonded to the bottom 32 of the tank 28 making sure the bottom edges are positioned flush against the sidewalls 30 of the tank 28. Additionally, the installer presses and rolls the bottom sheet 44 into the corners 36 in such a manner as to prevent bridging. In rolling out the air during the placement of the bottom sheet 44, the installer rolls from the center of the bottom sheet 44 and progressively from one end to the other to avoid pocketing air.

After bonding the bottom sheet 44, the installer bonds the pair of sheets 40 of the plurality of sheets 38 to adjacent walls 30 of the tank 28 and above the bottom sheet 44 such that the first edges 46 of the pair of sheets 40 are positioned at the intersection of adjacent walls 30 (i.e., the tank corner 36) of the tank 28 to position an interface 54 (FIG. 7) between the pair of sheets 40. Since the first edges 46 of the adjacent corner sheets may be beveled, the pair of sheets 40 is positioned at the corner intersection of the adjacent walls 30 to position a beveled region 56 between the pair of sheets 40 (FIG. 7). The installer then bonds the pair of sheets 40 to the walls 30 of the tank 28 by rolling or by pressuring the pair of sheets 40 to the walls 30 of the tank 28 to avoid trapping air between the pair of sheets 40 and the walls 30 of the tank 28. The pair of sheets 40 is bonded to the walls 30 of the tank 28 making sure the bottom edges of the pair of sheets 40 are positioned flush against the bonded bottom sheet 44. The installer presses and rolls the pair of sheets 44 into the corners in such a manner as to prevent overslipping.

After the corner pairs of sheets 40 and bottom sheet 44 are properly bonded to the tank 28, the installer activates a handle-held extrusion-welding device 58 (FIG. 10). The welding device 58 consists essentially of a hand-held drill serving as the drive system and removable attachment for this drill. In the attachment, a strand of thermoplastic material 60, supplied via one or several feed channels from a feed device, is first chopped up. The thermoplastic material 60 is then heated in a conveying device usually in the form of a worm conveyor and a plastering device so that the chopped thermoplastic material 60 reaches a plastic state and is then expelled as welding material through a welding chute of the welding device 58. The chute includes a degenerating device in the shape of an internal blower as well as a heating device. In one embodiment, the thermoplastic material 60 of the present disclosure comprises: permanent thermoplastic lining materials such as, but not limited to, flexible polyvinyl chloride (F-PVC), or polyethylene (HMW, HDPE, or LDPE), or polyurethane/PVC alloy, or synthetic rubber or flouropolymer (homopolymer or HFP copolymer PVDF, or alloys), ethylene-chloro-tri-fluoro-ethylene (Halar), or laminations of thermoplastic materials such as above. As such, extrusion welding of the present disclosure comprises heating and forcing out, under constant pressure and temperature, the thermoplastic material 60.

Figure 11:
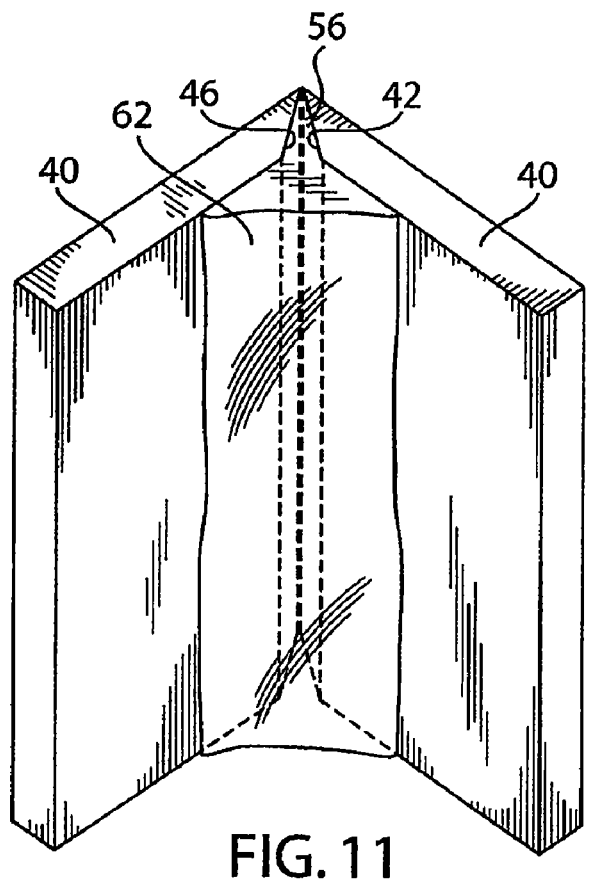
FIG. 11 is a front perspective of the pair of liner sheets and associated infused weld of FIG. 10 constructed in accordance with and embodying the present disclosure.
Figure 12:
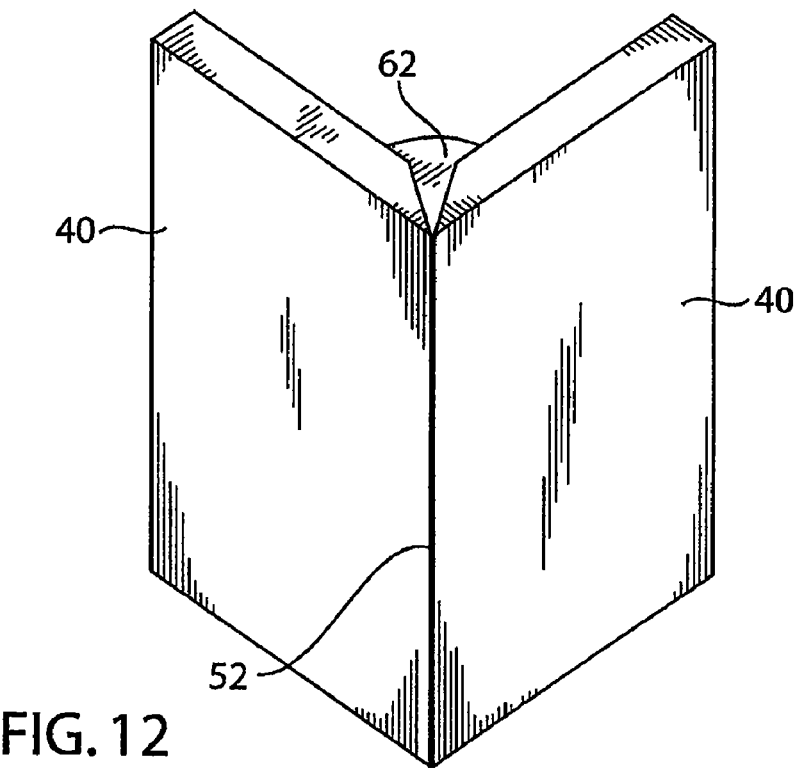
FIG. 12 is a back perspective view of the contacting pair of liner sheets of FIG. 10 further illustrating an infused weld constructed in accordance with and embodying the present disclosure wherein the infused weld joins the pair of liner sheets.
Figure 13:
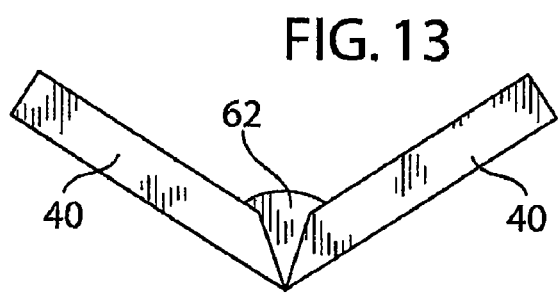
FIG. 13 is a plan view of the infused welded pair of liner sheets of FIG. 12.
Figure 14:
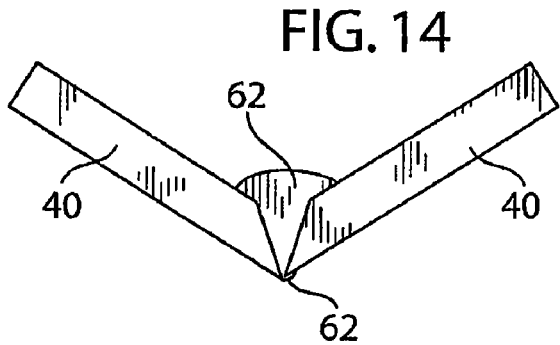
FIG. 14 is a plan view of an infused weld of the present disclosure wherein a portion of the infused weld extends beyond the beveled regions of the pair of liner sheets wherein this portion of the weld is exaggerated for purposes of clarity.

Referring to FIG. 10 and turning to FIGS. 11-13 and FIG. 22, the installer extrusion welds the corner pair of sheets 40 together by infusing the molten thermoplastic material 60 along the pair of sheets 40 and within the beveled region 56 of the pair of sheets 40. Infusing the molten thermoplastic material 60 comprises introducing the thermoplastic material 60 through and/or over and/or into the intersection (i.e., the beveled region 56) of the associated sheets (i.e., the pair of sheets 40). Since the first edges 46 of the adjacent pair of sheets 40 are beveled, this extrusion welding infuses the molten thermoplastic material 60 within the beveled edges of the pair of sheets 40. Due to the uniformity of the beveled edges, the weld infuses within the beveled regions 56 to seal the pair of sheets 40 together. In welding the pair of sheets 40, the installer typically welds from the top of the interface 54 between the pair of sheets 40 to the bottom of the interface 54. The installer repeats the thermoplastic welding process for the other pair of sheets 40 bonded to the remaining corners of the tank 28. FIG. 11 illustrates a front view of an infused weld 62 that seals the pair of sheets 40 while FIG. 12 illustrates a back view of the infused weld 62. Additionally, FIG. 13 shows a plan view of the infused weld 62 for the pair of sheets 40. Turning to FIG. 14, in one embodiment, the thermoplastic material 60 may weld the beveled region 56 between the pair of sheets 40 and slightly infuse beyond the sheets 40 to further seal the tank 28. FIG. 14 exaggerates the amount of infused thermoplastic material 60 beyond the region 54 for purposes of clarity. Since the weld infuses within the sheets 40, the weld 62 also fills any void that exists between the sheets 40 and the tank weld or other components of the tank. Furthermore, should the liner 26 shrink via interaction of the liner with a particular content such as a chemical, then the infused weld 62 maintains the integrity of liner 26 and maintains the sealing effect of the liner 26.

Returning to FIG. 10, the installer extrusion welds each corner pair of sheets 40 to the bottom sheet 44 by infusing the molten thermoplastic material 60 along and in between the pair of sheets 40 and the bottom sheet 44 wherein the infused material seals the pair of sheets 40 to the bottom sheet 44. Infusing the molten thermoplastic material 60 comprises introducing the thermoplastic material 60 through and/or over and/or into the intersection (i.e., the beveled region 56) of the associated sheets (i.e., the pair of sheets 40). In one embodiment, when the edges of the bottom sheet 44 and the bottom edges of the pair of sheets 40 are beveled, the extrusion welding infuses the molten thermoplastic material 60 within the beveled region between the pair of sheets 40 and the bottom sheet 44. In another embodiment, when the edges of the bottom sheet 44 and the bottom edges of the pair of sheets 40 are nonbeveled, the extrusion welding infuses the molten thermoplastic material 60 within the interface between the pair of sheets 40 and the bottom sheet 44. It should be known that the extrusion welding infuses the molten thermoplastic material 60 for any combination of beveled and non-beveled edges for the pair of sheets 40 and the bottom sheet 44. In welding the pair of sheets 40 to the bottom sheet 44, the installer typically welds from the left to the right. FIG. 10 illustrates the installer extrusion welding the pair of sheets 40 to the bottom sheet 44.

The extrusion weld 62 reinforces the material of the liner 26 from any reduction of the physical properties of the liner material that may occur during the installation process. The extrusion weld 62 is different from other welds, such as the "cap over" flat strip weld or "cap over" corner strip weld previously discussed. Since the infusion of the thermoplastic material 60 is an automated process via the extrusion welder 58, the thermoplastic material 60 is applied under controlled parameters such as constant pressure and constant temperature over time, which minimizes or eliminates pinholes. The extrusion welder 58 controls the melt pressure and the melt temperature with a display and control box for convenient operation and monitoring. Because of the controlled pressure and temperature, the extruded thermoplastic material 60 fuses more material within the sheets 38 than other weld methods. This automatic application of the thermoplastic material 60 under controlled parameters creates a thicker, deeper and stronger extrusion weld 62 while minimizing or eliminating pinholes.

Figure 15:
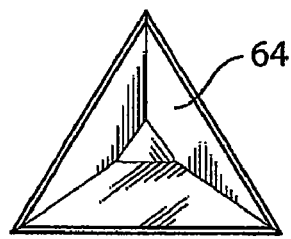
FIG. 15 is front view of a corner insert constructed in accordance with and embodying the present disclosure.
Figure 16:
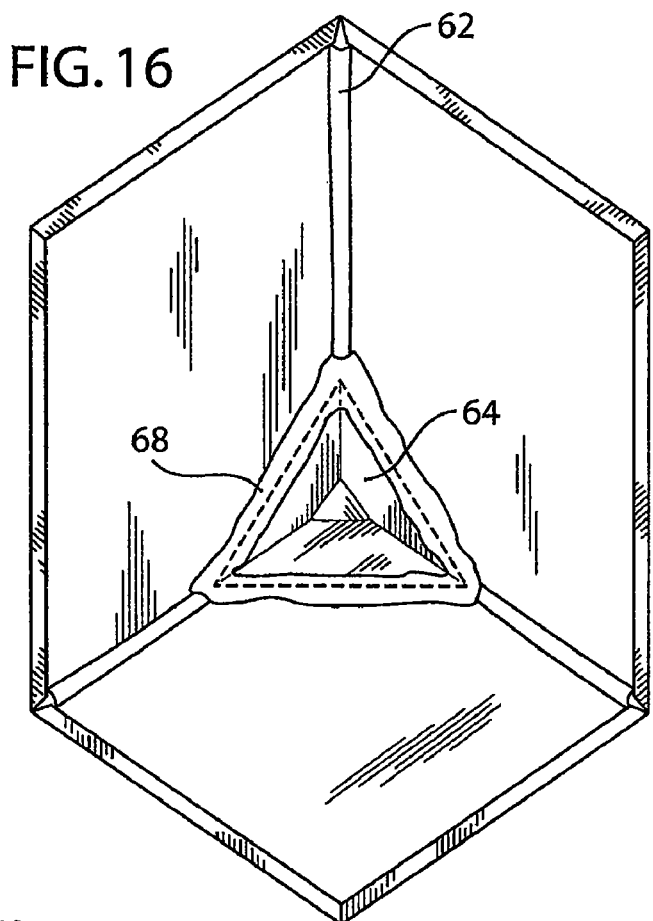
FIG. 16 is a partial perspective view of the insert of FIG. 15 welded to a corner of the lining.

Turning to FIG. 15, the present disclosure further comprises an insert. In one embodiment, the insert 64 comprises a triangular shape. The installer may form the insert 64 from the same material as the liner material for the lining 26. The thickness of the insert 64 has a range of about 3/16 inches to about 3/8 inches. The installer positions the insert 64 at each liner corner 66 (shown in FIG. 10 for clarity) which is formed by the infused pair of sheets 40 and bottom sheet 44. Referring to FIG. 16, the installer then extrusion welds the insert 64 to the infused pair of sheets 40 and the bottom sheet 44. As shown, extrusion welding the insert 64 to the liner corner 66 comprises infusing molten thermoplastic material 60 at predetermined distance beyond the insert 64 and along the infused pair of sheets 40 and bottom sheet 44. Infusing the molten thermoplastic material 60 comprises introducing the thermoplastic material 60 through and/or over and/or into the intersection (i.e., the beveled region 56) of the associated sheets (i.e., the pair of sheets 40) and insert 64. This thermoplastic material 60 is also infused under the controlled parameters of constant pressure and constant temperature over time to eliminate pinholes. This welding enhances the strength of the weld 68 between the insert 64 and the liner corner 66. In one embodiment, the predetermined distance beyond the insert 64 has a range of about two inches to about four inches. The installer repeats the welding of inserts 64 to each liner corner 66.

Returning to FIG. 5, the installer then bonds the other sheets 42 of the plurality of sheets 38 to the remaining surfaces of the tank 28. After bonding sheets 42 to the remaining surfaces of the tank 28, the installer welds contacting edges of any adjacent sheets 42 to any respective bonded sheet 38. As shown in FIG. 8, in one embodiment, the installer butt-welds the straight edges of adjacent sheets 42. As shown in FIG. 9, in another embodiment, the installer extrusion welds between the beveled edges of adjacent sheets 42. Infusing the molten thermoplastic material 60 comprises introducing the thermoplastic material 60 through and/or over and/or into the intersection (i.e., the beveled region 56) of the associated sheets (i.e., the pair of sheets 40). In this embodiment, the thermoplastic material 60 is infused under the controlled parameters of constant pressure and constant temperature over time to eliminate pinholes. The installer also bonds respective sheets 42 adjacent to the second edges 48 of each of the corner pair of sheets 40. In particular, the installer bonds the edges of the other sheets 42 in contact with the second edges 48 of the pair of sheets 40. In this position, the installer may butt-weld the other sheets 42 to the adjacent second edges 46 of the pair of sheets 40. In one embodiment, the installer butt-welds the straight edges 46 of adjacent sheets 40, 42. As shown in FIG. 9, in another embodiment, the installer extrusion welds between the beveled edges of the adjacent sheets 40, 42. In this embodiment, the thermoplastic material 60 is infused under the controlled parameters of the constant pressure and constant temperature over time to eliminate pinholes. FIG. 5 generally illustrates the weld (butt-weld/infused weld) that bonds corner sheets 40 to side sheets 42. It should be known that multiple side sheets 42 may be bonded and welded on any particular wall 30 of the tank 10 depending on the size of the tank 10. As the tank 10 may have a substantially tall height, it should be known that ascending rows of corner sheets 40 and side sheets 42 may be bonded and welded under the previously discussed processes.

Table 1 lists strength test results for a variety of weld locations for the welds of the present disclosure and prior art welds. The tests were conducted on an Instron Model 1122 1,000 lb. load cell, wherein all welds tested were used with Koroseal® liner material. In the table, the "base" refers to the stock material with no welds whatsoever. The "corner extrusion weld" position refers to the welding process of the present disclosure for welding the pair of side sheets. The "prior art weld" position refers to current welding processes such as the strip weld process previously discussed. The "butt weld" position refers to the welding process of the present disclosure as previously discussed and shown in FIG. 8. As shown in Table 1, the welding process of the present disclosure results in higher weld strengths than the prior art welds.

TABLE 1

| Weld | Material Thickness | Temperature | Failure Load - Lbs./inch | Weld Strength- Lbs./inch |
| --- | --- | --- | --- | --- |
| Base | 3/32 inch | 70° F. | 233 | 245 |
| Corner Extrusion Weld | 3/32 inch | 70° F. | 228 | 228 |
| Prior Art Weld | 3/32 inch | 70° F. | 163 | 165 |
| Base | 3/16 inch | 70° F. | 485 | 414 |
| Corner Extrusion Weld | 3/16 inch | 70° F. | 324 | 317 |
| Prior Art Weld | 3/16 inch | 70° F. | 306 | 227 |
| Corner Extrusion Weld | 3/16 inch | 180° F. | 135 | 98 |
| Prior Art Weld | 3/16 inch | 180° F. | 78 | 54 |
| Butt Weld | 3/16 inch | 70° F. | 405 | 397 |

Figure 17:
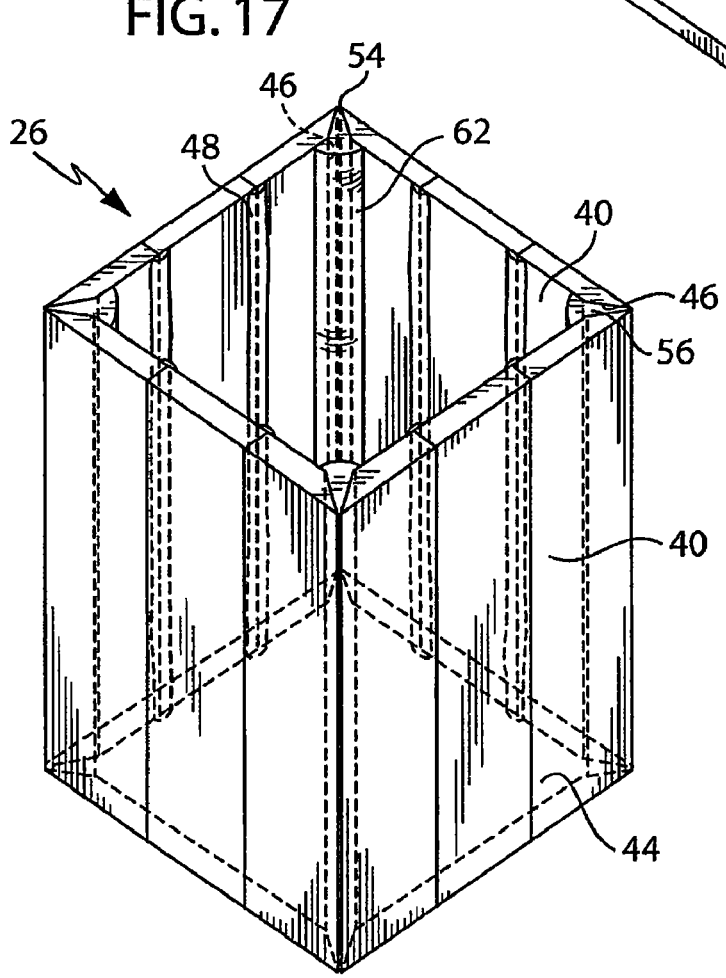
FIG. 17 is a perspective view of a lining constructed in accordance with and embodying the present disclosure.

Turning to FIG. 17, the resulting lining 26 formed by the process of the present disclosure is shown. As illustrated, the lining 26 comprises the bottom sheet 44, the pairs of sheets 40 wherein each pair has the first edge 46 and the second edge 48 that may be beveled forming the beveled region 56 between each pair of sheets 40. The lining 26 further comprises the infused weld 62 along and within the interface 54 that is between the corner sheets 40. The extrusion weld 62 seals the pair of sheets 40 to each other and to the bottom sheet 44 while eliminating pinholes. The lining 26 further comprises the insert 64 welded to the lining corner 66 (FIG. 15) that is formed by the pairs of sheets 40 and the bottom sheet 44. As previously noted the thickness of each sheet 40 is at least 3/32 inches. Furthermore, the thickness of the insert 64 (FIG. 16) has a range of about 3/16 inches to about 3/8 inches. The lining 26 may also comprise the intermediate side sheets 42 (FIG. 5) that may be welded to the second edge 48 of the pair of each of the sheets 40.

Referring to FIGS. 18-21, some contents such as chrome solutions become more reactive as the chrome solution contacts ambient air. PVC is particularly susceptible to attack by chrome solutions at this solution and air interface. Accordingly, current process tanks position a sacrificial layer of material at the top of the process tank, which is exposed to the ambient air. The reactive solution chemically attacks the sacrificial layer. When the sacrificial layer nears the end of its useful life, the installer removes the sacrificial layer and replaces it with a new sacrificial layer. This replacement process for the sacrificial layer is an expansive and labor intensive process. Currently, sacrificial layers uses a double thickness of bonded High Performance Koroseal®, which protects the bonded to metal lining beneath it for a period of time such as one to six years. Other skirt materials such as Teflon that are minimally affected or not affected at all by the chrome solution and air interface are very worthy remedies. For example, the previously discussed "drop-in" liner typically uses a Teflon® skirt.

Turning to FIG. 18, in one embodiment, the method of the present disclosure comprises bonding an intermediate layer 70 to liner 26. In an embodiment, this intermediate layer 70 comprises a rigid PVC material. Next, the method comprises affixing a sacrificial layer 72 to the intermediate layer 70. In an embodiment, the sacrificial layer 72 comprises a polyvinylidene fluoride material commonly known as Kynar™. This sacrificial layer 72 is affixed along the length of the intermediate layer 70 by welding the sacrificial layer 72 to the intermediate layer 70 using a weld material that comprises a hybrid rod material known as JSR #1. FIG. 19 illustrates a resulted liner being bonded with the intermediate layer 70 and the sacrificial layer 72 being affixed to the intermediate layer 70.

Turning to FIG. 20, in another embodiment, the sacrificial layer 72 of FIG. 18 is directly affixed over the lining 26. In this method, these sacrificial layers 72 are welded to the lining 26 by using the hybrid rod material known as JSR #2 (soft). FIG. 21 illustrates the resulted lining 26 welded to the sacrificial layer 72. In the embodiment of FIGS. 18-21, the heights of the intermediate and sacrificial layers 70, 72 may be adjustable to accommodate varying levels of corrosive solutions dispersed within the tank.

In an embodiment, the sacrificial layer 72 may be affixed to the intermediate layer 70 or to the lining 26 in a loose or sliding arrangement so that the sacrificial layer 72 can handle thermal expansion and contraction as the sacrificial layer 72 heats and cools in response to chemical reactions.

In another embodiment (not shown), the lining of the present disclosure further comprises an absorption layer that bonds to the top of the bottom sheet. In some tank applications, parts that are being processed damage the bottom sheet due to the part's weight and configuration. For example, an operator may mishandle a part while lowering the part in the solution. As such, the part may rapidly and uncontrollably drop into the tank and tear the bottom sheet. In another example, a part may dislodge from its carrier and drop into the tank and tear the bottom sheet.

Some current process tanks are protected by chemical resistant masonry sheathings ("acid brick"). While these brick linings are not hydrostatically tight as a tank lining, (in fact, these linings are porous), the linings do offer both thermal and mechanical protection to the bottom sheet of the liner. Acid brick has a very high cost factor, however, as it must be installed on site, and must be removed and replaced, if the tank needs eventual relining. For some applications (hard chrome plating for example), the used brick layer is considered hazardous waste leading to increased risks for personnel and to increased disposal costs.

In the alternative embodiment, the lining of the present disclosure comprises an impact absorbing bumper pad positioned over the bottom sheet. In the present disclosure, this impact protective layer comprises at least one of a honeycomb, egg-crate or laminate structure. These structures may comprise a non-float (high specific gravity) thermoplastic. This structure may also comprise compressible material that absorbs impact from dropped parts. By being made of pieces of a size and weight easily handled by installation personnel, this structure is easily removed from the tank bottom if a lining repair on or near the bottom is ever required.

In view of the above, it will be seen that the several objects of the disclosure are achieved and other advantageous results are obtained. As various changes could be made in the above constructions without departing from the scope of the disclosure, it is intended that all matter contained in the above description or shown in the accompanying drawings shall be interpreted as illustrative and not in a limiting sense.

The invention claimed is:

1. A method of lining a tank with a plurality of sheets, the tank having walls and a bottom that intersect at a corner of the tank, the method comprising:
   bonding a bottom sheet of the plurality of sheets to the bottom of the tank;
   bonding a pair of sheets of the plurality of sheets to adjacent walls of the tank and above the bottom sheet, each sheet of the pair of sheets having a first edge and a second edge such that the first edges of the pair of sheets are positioned at the intersection of adjacent walls of the tank to position an interface between the pair of sheets;
   extrusion welding the pair of sheets together by infusing a molten thermoplastic material along the pair of sheets and within the interface of the pair of sheets;
   extrusion welding the pair of sheets to the bottom sheet by infusing the molten thermoplastic material along and between the pair of sheets and the bottom sheet; and
   positioning a triangular insert at a lining corner formed by the infused pair of sheets and bottom sheet and extrusion welding the insert to the infused pair of sheets and bottom sheet wherein the infused thermoplastic material seals the pair of sheets and bottom sheet to isolate the tank from contents that contact the pair of sheets and bottom sheet.

2. The method of claim 1 further comprising beveling the first edges of the pair of sheets and beveling edges of the bottom sheet prior to bonding the pair of the sheets to the adjacent walls.

3. The method of claim 2 wherein infusing the molten thermoplastic material within the interface comprises infusing the molten thermoplastic material within the beveled side edges of the pair of sheets.

4. The method of claim 1 wherein extrusion welding the insert to the lining corner comprises infusing molten thermoplastic material at a predetermined distance beyond the insert and along the infused pair of sheets and bottom sheet.

5. The method of claim 4 wherein the thickness of the insert has a range of about a 3/16 inch to about a 3/8 inch.

6. The method of claim 4 wherein the pre-determined distance beyond the insert has a range of about two inches to about four inches.

7. The method of claim 1 wherein the infused weld between the pair of sheets comprises a weld strength of about 300 pounds/inch.

8. A lining produced according to the method of claim 1.

9. A method of lining a tank, the method comprising:
   extrusion welding a pair of sheets together by infusing a molten thermoplastic material along and between the pair of sheets;
   extrusion welding the pair of sheets to a bottom sheet by infusing the molten thermoplastic material along and between the pair of sheets and the bottom sheet wherein the infused thermoplastic material seals the pair of sheets and bottom sheet to isolate the tank from contents that contact the pair of sheets and bottom sheet when the tank is filled with the contents; and positioning a triangular insert at a lining corner formed by the infused pair of sheets and bottom sheet and extrusion welding the triangular insert to the infused pair of sheets and bottom sheet.

10. A lining method for use with a tank, comprising:
bonding a bottom sheet of a plurality of plasticized polyvinyl chloride sheets to a bottom of the tank;
bonding a pair of sheets of the plurality of plasticized polyvinyl chloride sheets to adjacent walls of the tank and above the bottom sheet, each sheet of the pair of sheets having a first edge and a second edge such that the first edges of the pair of sheets are positioned at an intersection of adjacent walls of the tank to position an interface between the pair of sheets;
exposing the interface between the pair of sheets to the atmosphere;
moving a portable extrusion welder near the exposed interface;
activating the portable extrusion welder to generate and discharge molten thermoplastic material;
controlling the pressure and temperature of the discharged molten thermoplastic material;
extrusion welding the pair of sheets together by infusing the molten thermoplastic material from the portable extrusion welder, along the pair of sheets and within the exposed interface of the pair of sheets at the controlled pressure and temperature;
extrusion welding the pair of sheets to the bottom sheet by infusing the molten thermoplastic material along and between the pair of sheets and the bottom sheet at the controlled pressure and temperature wherein the infused thermoplastic material seals the pair of sheets and bottom sheet to isolate the tank from contents that contact the pair of sheets and bottom sheet; and
positioning a triangular insert at a lining corner formed by the infused pair of sheets and bottom sheet and extrusion welding the insert to the infused pair of sheets and bottom sheet wherein the infused thermoplastic material seals the pair of sheets and bottom sheet to isolate the tank from contents that contact the pair of sheets and bottom sheet.

11. The lining method of claim 10 further comprising beveling the first edges of the pair of sheets and beveling edges of the bottom sheet prior to bonding the bottom sheet and the pair of side sheets to the tank.

12. The lining method of claim 11 wherein infusing the molten thermoplastic material within the interface comprises infusing the molten thermoplastic material within the beveled side edges of the pair of sheets.

13. The lining method of claim 10 wherein bonding the pair of sheets to the adjacent corner walls of the tank and above the bottom sheet comprises bonding the pair of sheets in a perpendicular orientation with respect to the pair of sheets and bonding the pair of sheets in a perpendicular orientation with respect to the bottom sheet.

14. A lining method for use with a tank, comprising:
bonding a bottom sheet of a plurality of sheets to a bottom of the tank;
bonding a pair of sheets of the plurality of sheets to a wall of the tank and above the bottom sheet to position an interface between the pair of sheets and the bottom sheet, each sheet of the pair of sheets having a first edge and a second edge such that the first edges of the pair of sheets position another interface between the pair of sheets;
exposing the interface between the pair of sheets and the bottom sheet and the other interface between the pair of sheets to the atmosphere;
moving a portable extrusion welder near the exposed interfaces;
activating the portable extrusion welder to generate and discharge molten polyvinyl chloride material;
controlling the pressure and temperature of the discharged molten polyvinyl chloride material;
extrusion welding the pair of sheets together by infusing the molten polyvinyl chloride material from the portable extrusion welder, along the pair of sheets and within the exposed interface of the pair of sheets;
extrusion welding the pair of sheets to the bottom sheet by infusing the molten polyvinyl chloride material along and between the pair of sheets and the bottom sheet and within the exposed interface between the pair of sheets and the bottom sheet at the controlled pressure and temperature wherein the infused polyvinyl chloride material seals the pair of sheets and bottom sheets to isolate the tank from contents that contact the pair of sheets and bottom sheet;
positioning a triangular insert at a lining corner formed by the infused pair of sheets and bottom sheet and extrusion welding the insert to the infused pair of sheets and bottom sheet wherein the infused thermoplastic material seals the pair of sheets and bottom sheet to isolate the tank from contents that contact the pair of sheets and bottom sheet.

15. The lining method of claim 14 wherein bonding the pair of sheets to the wall of the tank and above the bottom sheet comprises bonding the pair of sheets in a perpendicular orientation with respect to the pair of sheets and bonding the pair of sheets in a perpendicular orientation with respect to the bottom sheet.

16. A method of lining a tank, the method comprising:
extrusion welding a pair of plasticized polyvinyl chloride sheets together by infusing a molten thermoplastic material along and between the pair of plasticized polyvinyl chloride sheets;
extrusion welding the pair of plasticized polyvinyl chloride sheets to a bottom plasticized polyvinyl chloride sheet by infusing the molten thermoplastic material along and between the pair of plasticized polyvinyl chloride sheets and the bottom plasticized polyvinyl chloride sheet wherein the infused thermoplastic material seals the pair of plasticized polyvinyl chloride sheets and bottom plasticized polyvinyl chloride sheet to isolate the tank from contents that contact the pair of plasticized polyvinyl chloride sheets and bottom plasticized polyvinyl chloride sheet when the tank is filled with the contents; and
positioning a triangular insert at a lining corner formed by the infused pair of plasticized polyvinyl chloride sheets and plasticized polyvinyl chloride bottom sheet and extrusion welding the insert to the infused pair of sheets and bottom sheet wherein the infused thermoplastic material seals the pair of sheets and bottom sheet to isolate the tank from contents that contact the pair of sheets and bottom sheet.

17. A method of lining a tank, the method comprising:
extrusion welding a pair of sheets together by infusing a molten thermoplastic material along and between the pair of sheets; and
extrusion welding the pair of sheets to a bottom sheet by infusing the molten thermoplastic material along and between the pair of sheets and the bottom sheet wherein the infused thermoplastic material seals the pair of sheets and bottom sheet to isolate the tank from contents that contact the pair of sheets and bottom sheet when the tank is filled with the contents, wherein extrusion welding comprises:

exposing the pair of sheets and the bottom sheet to the atmosphere;

activating a portable extrusion welder to generate and discharge molten polyvinyl chloride material;

controlling the pressure and temperature of the discharged molten polyvinyl chloride material;

extrusion welding the pair of sheets together by infusing the molten polyvinyl chloride material from the portable extrusion welder, along the pair of sheets and along the pair of sheets and the bottom sheet; and positioning a triangular insert at a lining corner formed by the infused pair of sheets and bottom sheet and extrusion welding the insert to the infused pair of sheets and bottom sheet wherein the infused thermoplastic material seals the pair of sheets and bottom sheet to isolate the tank from contents that contact the pair of sheets and bottom sheet.

18. A method of lining a tank, the method comprising:

bonding a bottom sheet of a plurality of plasticized polyvinyl chloride sheets to the bottom of the tank;

bonding a pair of sheets of the plurality of plasticized polyvinyl chloride sheets to a wall of the tank and above the bottom sheet to position an interface between the pair of sheets;

activating a portable extrusion welder to generate and discharge molten thermoplastic material;

controlling the pressure and temperature of the discharged molten thermoplastic material;

extrusion welding the pair of sheets together by infusing the molten thermoplastic material from the portable extrusion welder, along the pair of sheets and within the interface of the pair of sheets at the controlled pressure and temperature;

extrusion welding the pair of sheets to the bottom sheet by infusing the molten thermoplastic material along and between the pair of sheets and the bottom sheet at the controlled pressure and temperature wherein the infused thermoplastic material seals the pair of sheets and bottom sheet to isolate the tank from contents that contact the pair of sheets and bottom sheet; and positioning a triangular insert at a lining corner formed by the infused pair of sheets and bottom sheet and extrusion welding the insert to the infused pair of sheets and bottom sheet wherein the infused thermoplastic material seals the pair of sheets and bottom sheet to isolate the tank from contents that contact the pair of sheets and bottom sheet.

* * * * *